United States Patent
Wakeford et al.

(10) Patent No.: US 9,330,531 B1
(45) Date of Patent: May 3, 2016

(54) SYSTEM AND METHOD FOR DISPLAYING A GAME USING A PRIMARY DISPLAY AND COMMUNICATING ALLIANCE INFORMATION AMONG ALLIANCE MEMBERS USING A SECONDARY DISPLAY

(71) Applicants: Kent Wakeford, Hillsborough, CA (US); Clifford J. Harrington, San Francisco, CA (US)

(72) Inventors: Kent Wakeford, Hillsborough, CA (US); Clifford J. Harrington, San Francisco, CA (US)

(73) Assignee: KABAM, INC., San Francisco, CA (US)

( * ) Notice: Subject to any disclaimer, the term of this patent is extended or adjusted under 35 U.S.C. 154(b) by 126 days.

(21) Appl. No.: 13/828,469

(22) Filed: Mar. 14, 2013

(51) Int. Cl.
*A63F 13/12* (2006.01)
*G07F 17/32* (2006.01)
*A63F 13/30* (2014.01)

(52) U.S. Cl.
CPC ............ *G07F 17/3225* (2013.01); *A63F 13/12* (2013.01); *A63F 2300/301* (2013.01); *A63F 2300/408* (2013.01); *A63F 2300/556* (2013.01); *A63F 2300/5533* (2013.01); *A63F 2300/6045* (2013.01)

(58) Field of Classification Search
CPC ... H04L 67/38; A63F 13/12; A63F 2300/556; A63F 2300/5533; A63F 2300/1043; A63F 2300/301; A63F 2300/408; A63F 2300/6045
USPC .............................................. 463/42; 700/94
See application file for complete search history.

(56) References Cited

U.S. PATENT DOCUMENTS

| | | | |
|---|---|---|---|
| 6,567,984 B1 | 5/2003 | Allport | 725/110 |
| 6,878,067 B2 | 4/2005 | Blanco | |
| 7,047,030 B2 | 5/2006 | Forsyth | 455/518 |
| 7,194,754 B2 | 3/2007 | Tomsen et al. | 725/60 |
| 7,580,005 B1 | 8/2009 | Palin | |
| 7,637,813 B2 | 12/2009 | Katayama et al. | 463/31 |
| 8,156,004 B2 | 4/2012 | Wajihuddin | 705/14.5 |
| 8,226,476 B2 | 7/2012 | Haltovsky et al. | 463/30 |
| 8,270,641 B1 | 9/2012 | Greenberg | 381/306 |
| 8,282,490 B2 | 10/2012 | Arezina et al. | 463/42 |
| 2002/0110246 A1* | 8/2002 | Gosior et al. | 381/2 |
| 2003/0013527 A1* | 1/2003 | Rowe et al. | 463/42 |
| 2003/0216181 A1 | 11/2003 | Danieli et al. | 463/39 |

(Continued)

OTHER PUBLICATIONS

Wii U Official Site—Built in Software, Nintendo, http://www.nintendo.com/wiiu/built-in-software/*/eshop, printed Feb. 16, 2013, 5 pages.

(Continued)

*Primary Examiner* — Michael Cuff
(74) *Attorney, Agent, or Firm* — Sheppard Mullin Richter & Hampton LLP

(57) ABSTRACT

The disclosure relates to systems and methods for communicating a primary display comprising information that facilitates visual presentation of a view of a game space to a primary client device and facilitating communication of alliance information among members of an alliance through a secondary client device such as a user's smartphone. The system may include a game device that allows a user to play a video game or otherwise interact with a virtual environment, and send or receive alliance information using the primary client device and send or receive alliance information using a secondary client device while playing the video game using the primary client device. The primary client device or the secondary client device may also be used to control actions taken by the alliance. Thus, alliance control may be facilitated using either or both of the primary client device and the secondary client device.

14 Claims, 9 Drawing Sheets

(56) References Cited

U.S. PATENT DOCUMENTS

| | | |
|---|---|---|
| 2006/0111188 A1 | 5/2006 | Winkler |
| 2007/0021192 A1 | 1/2007 | Tamimoto |
| 2007/0087831 A1 | 4/2007 | Luchene |
| 2007/0265073 A1 | 11/2007 | Novi |
| 2008/0026849 A1 | 1/2008 | Bird ............................... 463/42 |
| 2008/0214273 A1 | 9/2008 | Snoddy et al. .................. 463/19 |
| 2009/0098940 A1* | 4/2009 | Sangberg ........................ 463/42 |
| 2009/0264190 A1* | 10/2009 | Davis et al. .................... 463/26 |
| 2010/0056280 A1 | 3/2010 | Langan et al. .................. 463/42 |
| 2010/0069158 A1 | 3/2010 | Kim |
| 2010/0099471 A1* | 4/2010 | Feeney et al. ..................... 463/1 |
| 2010/0178973 A1 | 7/2010 | Snoddy et al. .................. 463/19 |
| 2010/0185721 A1 | 7/2010 | Merrifield |
| 2010/0267448 A1 | 10/2010 | Snoddy et al. .................. 463/30 |
| 2011/0092271 A1* | 4/2011 | Nguyen .......................... 463/25 |
| 2011/0143835 A1 | 6/2011 | Sizelove ........................ 463/31 |
| 2012/0038742 A1 | 2/2012 | Robinson et al. .......... 348/14.16 |
| 2012/0038827 A1 | 2/2012 | Davis |
| 2012/0059795 A1* | 3/2012 | Hersh et al. ................... 707/628 |
| 2012/0220354 A1 | 8/2012 | Haltovsky |
| 2012/0249591 A1 | 10/2012 | Maciocci et al. ............. 345/633 |
| 2012/0270646 A1 | 10/2012 | Walker et al. ................... 463/29 |
| 2012/0304584 A1 | 12/2012 | Pan |
| 2013/0046781 A1 | 2/2013 | Frankel |
| 2013/0053144 A1 | 2/2013 | Nicely ........................... 463/35 |
| 2013/0072308 A1 | 3/2013 | Peck |
| 2013/0246942 A1 | 9/2013 | Merrifield |
| 2013/0254680 A1* | 9/2013 | Buhr et al. .................... 715/753 |
| 2014/0176534 A1 | 6/2014 | Vignocchi |

OTHER PUBLICATIONS

AMD Eyefinity Technology, http://www.amd.com/us/products/technologies/amd-eyefinity-technology/pages/eyefinity.a . . . , printed Feb. 13, 2013, 1 page.

* cited by examiner

SYSTEM AND METHOD FOR DISPLAYING A GAME USING A PRIMARY DISPLAY AND COMMUNICATING ALLIANCE INFORMATION AMONG ALLIANCE MEMBERS USING A SECONDARY DISPLAY

FIELD OF THE INVENTION

The disclosure relates to systems and methods for communicating a primary display comprising information that facilitates visual presentation of a view of a game space to a primary client device and facilitating communication of alliance information among members of an alliance through a secondary client device such as a user's smartphone.

BACKGROUND OF THE INVENTION

Multi-user games and other applications that display a virtual space may allow users to form alliances with one another (e.g., avatars or other user-controlled objects may form alliances at the direction of users playing the game). An alliance may be formed to pool assets or otherwise coordinate actions of individual alliance members. An alliance is often made more effective when communication of alliance information is timely made to alliance members. Communication of alliance information is conventionally provided using only a single display, which may be communicated to all alliance members. However, providing alliance information over a single display, which may be shared among all alliance members, may be problematic. For example, it may be beneficial to restrict access of certain alliance information to some alliance members, such as alliance leaders or users who have been alliance members for a long period of time, but not others.

SUMMARY OF THE INVENTION

The disclosure relates to systems and methods for communicating a primary display comprising information that facilitates visual presentation of a view of a game space to a primary client device and facilitating communication of alliance information among members of an alliance through a secondary client device such as a user's smartphone. The system may include a game device that allows a user to play a video game or otherwise interact with a virtual environment, and send or receive alliance information using the primary client device and send or receive alliance information using a secondary client device while playing the video game using the primary client device. The primary client device or the secondary client device may also be used to control actions taken by the alliance. Thus, alliance control may be facilitated using either or both of the primary client device and the secondary client device.

The game device may be configured to coordinate the primary client device and the secondary client device such that gameplay and alliance information communicated during gameplay are associated with the given user playing the game. In this manner, a user may control one or more graphical objects within the game space through the primary client device and send/receive alliance information through the primary client device and/or the secondary client device.

In some embodiments, the game device may determine whether to communicate the alliance information to the primary client device and/or the secondary client device based on one or more factors. For example, the game device may make the determination based on whether the alliance information is generally available to all alliance members (in which case the alliance information may be communicated to the primary client device or the secondary client device). On the other hand, alliance information that is restricted to only certain alliance members may be communicated to one or more secondary client devices operated by the appropriate alliance members. In this manner, communication of restricted alliance information may be limited to alliance members having access to the restricted alliance information.

In some embodiments, the game device may determine whether to communicate alliance information to the primary client device or the secondary client device based on roles assigned to particular alliance information or categories of alliance information. For example, a user may indicate that certain alliance information or categories of alliance information should be communicated to primary client devices, secondary client devices, or both primary and secondary client devices.

In some embodiments, the game device may determine whether to communicate alliance information to the primary client device or the secondary client device based on particular architectures being used to play the game. For example, certain users may not be operating secondary client devices (e.g., are using only primary client devices to play the game) while other users are operating secondary client devices. In these embodiments, the game device may take into consideration whether a given user is playing the game using a secondary client device in addition to the primary client device.

In some embodiments, the game device may categorize alliance information based on input from an alliance member such as a leader of the alliance. Certain categories of information (e.g., alliance information that describes inventory levels of alliance assets, alliance information that are communications between leaders of an alliance, etc.) may be restricted such that only some alliance members may view or otherwise interact with the restricted alliance information. Another category of alliance information may generally available to all alliance members. Other categories of alliance information may be used as well. Similarly, particular alliance information may be categorized as well, such as a particular inventory level of a particular asset or a particular communication between alliance members.

In some embodiments, the primary client device and/or the secondary client device may present one or more controls for controlling an action of the alliance. A user of the primary and/or the secondary client device may provide inputs through the controls to generate one or more commands or otherwise cause the action of the alliance. Certain controls may be provided to some alliance members but not others. The logic for determining which controls to present to the different alliance members may reside at the game device, the primary client device, and/or the secondary client device.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

Figure 1:
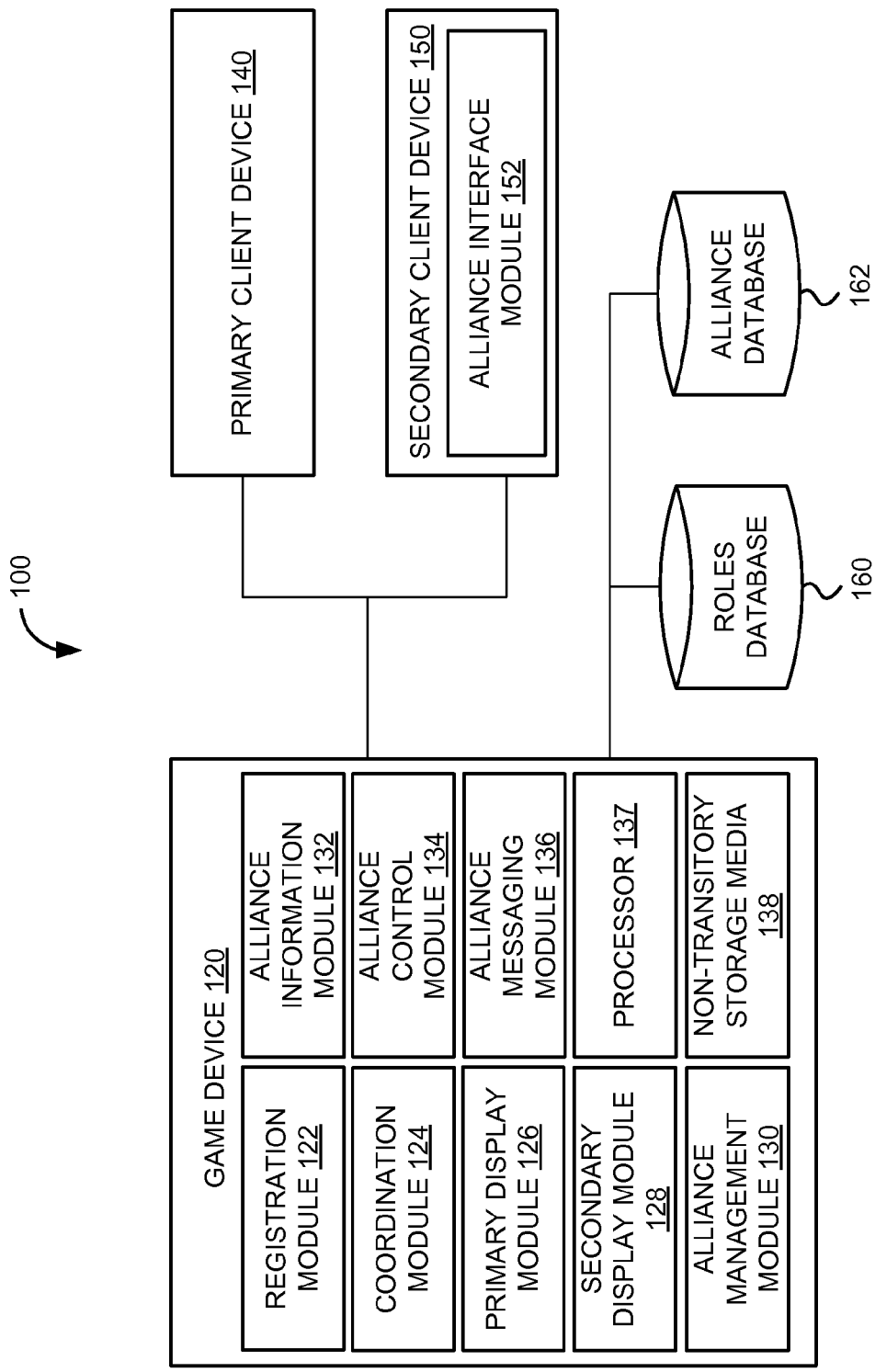
FIG. 1 illustrates a system configured to provide a primary display that includes a game space and a secondary display that facilitates communication of alliance information while the game space is displayed via the primary display, according to an embodiment of the invention.

FIG. 1 illustrates a system 100 configured to provide a primary display that includes a game space and a secondary display that facilitates communication of alliance information while the game space is displayed via the primary display, according to an embodiment of the invention. Alliance information may include information related to a status of the alliance, inventory levels of alliance assets, position of alliance assets, communications, commands for controlling the alliance or assets of the alliance, and/or other information related to the alliance. Sharing alliance information may facilitate coordination, resource management, communication, and/or other benefits for the alliance.

At least some alliance information may be categorized such that some alliance members may have access to certain categories of alliance information while other alliance members do not. Such access may be defined by roles assigned to alliance members, as described in more detail below.

As used herein, a "user" may include a game player that may be represented by an avatar or other graphical representation in the game space and may be identified by a user handle or other identifier. An "alliance member" may include a user who is a member of or otherwise affiliated with an alliance.

System 100 may include a game device 120, a primary client device 140, a secondary client device 150, and/or other components. Although only a single game device 120, a single primary client device 140, and a single secondary client device 150 is illustrated in FIG. 1, other numbers of the foregoing devices may be used and other configurations of system 100 may be used, examples of which are illustrated in FIGS. 3A-3C and FIGS. 4A and 4B.

Game device 120 may include one or more processors 137 configured to execute one or more modules such as a registration module 122, a coordination module 124, a primary display module 126, a secondary display module 128, an alliance management module 130, an alliance information module 132, an alliance control module 134, an alliance messaging module 136, and/or other modules.

In some embodiments, registration module 122 may be configured to register a user with the system. For example, registration module 122 may obtain user information such as a name, age, game handle (e.g., virtual name), credential information (e.g., username, password, keys), and/or other information that describes the user.

To facilitate use of secondary client device 150, registration module 122 may obtain an identification of the secondary client device. For example, in embodiments where the secondary client device 150 used by a user to send and/or receive alliance information includes the user's mobile device, registration module 122 may obtain an identification of the mobile device such as a Media Access Control address.

In some embodiments, coordination module 124 may be configured to coordinate the activities of primary display module 126 and secondary display module 128. For example, coordination module 124 may receive a logon, device identifier, and/or other identifying information from the user via primary client device 140 and/or secondary client device 150.

Coordination module 124 may be configured to manage communication between primary display module 126 and primary client device 140 for communicating a primary display generated by the primary display module. Likewise, coordination module 124 may manage communication between secondary display module 128 and secondary client device 150 for communicating a secondary display generated by the secondary display module.

Coordination module 124 may recognize that the user wishes to initiate a gameplay session using primary client device 140 and secondary client device 150 based on the identifying information received from primary client device 140 and secondary client device 150. Initiating the gameplay session may include joining an existing online game (e.g., a multi-user online game that operates whether or not a particular user is logged onto the game), initiating a new online game, hosting an online game, initiating a local game, and/or otherwise allowing the user to begin playing the game.

Accordingly, coordination module 124 may initiate and coordinate a gameplay session that is associated with a primary display communicated to primary client device 140 and a secondary display communicated to secondary client device 150. For example, a gameplay session identifier may be associated with identities of a user, primary client device 140, and/or secondary client device 150 such that information that facilitates visual presentation of a view of a game space may be communicated to primary client device 140 and alliance information may be communicated to secondary client device 150 during gameplay. By doing so, coordination module 124 may ensure that game device 120 is able to coordinate gameplay occurring via a primary display communicated to primary client device 140 and alliance information being included on a secondary display communicated to secondary client device 150.

Coordination of primary client device 140 and the secondary client device 150 may occur in various ways. By way of example only, the user may logon to a gameplay session via both primary client device 140 and secondary client device 150. For example, primary client device 140 may include a computing device used to connect to game device 120 for playing an online game. Secondary client device 150 may include a smartphone programmed with alliance interface module 152 that communicates with game device 120 for sending/receiving alliance information to be communicated to other secondary client devices and/or primary client devices.

In some embodiments, primary client device 140 and/or secondary client device 150 may be pre-registered with the system, such as via registration module 122 such that game device 120 may recognize either or both devices. For example, upon logging onto the system to start a gameplay session using primary client device 140, a connection with secondary client device 150 may automatically be established.

Primary display module 126 may be configured to communicate information that facilitates visual presentation of a view of a game space to the user on primary client device 140. Responsive to the communicated information from primary display module 126, primary client device 140 may render the visual presentation of the game space such that the user can play the game.

In some embodiments, primary display module 126 may be configured to provide at least some alliance information on the primary display. In these embodiments, at least a portion of the primary display may be reserved for the alliance information and/or alliance information may be overlayed onto other visual presentations of the game space presented on the primary display.

In some embodiments, primary display module 126 may be configured to provide different primary displays to different primary client devices 140. For example, assuming a communication that is restricted to two leaders of an alliance is to be communicated and the two leaders are sharing a primary display device 140 or using their own respective primary display devices 140 (as indicated by coordination module 124), a first primary display may be communicated to the primary display device 140 used by the two leaders while a second primary display may be communicated to remaining members of the alliance. Similarly, primary display module 126 may be configured to communicate different primary displays to members of different alliances. In this manner, alliance information that is presented on a primary display may still be kept secret from users who should not have access to such alliance information.

In some embodiments, primary display module 126 may communicate game events such as user inputs from primary client device 140, inputs from other users in a multi-user game, actions resulting from the inputs, and/or other game events to other modules of game device 120, such as coordination module 124. In this manner, various modules of game device 120 may be updated with current game events and act accordingly, as described herein.

In some embodiments, secondary display module 128 may be configured to communicate alliance information for presentation during the game to the user at secondary client device 150. In some embodiments, the secondary display module 128 may receive, from secondary client device 150, alliance information to be shared with one or more members of the alliance and/or alliance information that includes a command for controlling one or more aspects of the alliance, such as changing alliance membership, attacking an enemy, acquiring assets, moving alliance assets, declaring war, making peace, and/or other commands that influence a behavior of the alliance. Responsive to the alliance information and/or commands, secondary display module 128 may cause the alliance information to be communicated to appropriate members of the alliance and/or cause the commands to be executed.

In some embodiments, alliance management module 130 may be configured to create alliances, update alliance membership, categorize alliance information, set roles for alliance members, and/or perform other management functions for a given alliance. Alliance management module 130 may create an alliance when two or more users agree form an alliance. Using a primary display communicated to primary client device 140 and/or a secondary display communicated to secondary client device 150, a user may indicate a desire to form an alliance with at least one other user. Once an alliance is created, alliance management module 130 may update the alliance membership such as by adding new alliance members or deleting alliance members. Alliance memberships and other alliance information may be stored in alliance database 162.

In some embodiments, alliance management module 130 may categorize alliance information based on input from an alliance member. The categories of alliance information may determine a level of access required to view or otherwise interact with the alliance information. For example, alliance management module 130 may categorize inventory levels of an alliance as being generally open for viewing by all alliance members but categorize communications made between leaders of an alliance as being secured and available for viewing/interacting only by alliance leaders.

In some embodiments, alliance management module 130 may assign one or more roles to a given alliance member. A role may be associated with a level of access to alliance information, different controls for controlling an alliance action, and/or other aspects of the alliance. For example, a role may specify a rank of an alliance member within the alliance such that only certain ranks (e.g., a leader or general) may be granted access alliance information that is reserved for access only by certain ranks. A listing of roles and access levels for which they may relate may be stored in roles database 160.

In some embodiments, alliance information module 132 may be configured to obtain and provide alliance information to primary display module 126 and/or secondary display module 128 for communication to respective primary client device 140 and/or secondary client device 150. In some embodiments, alliance information module 132 may determine whether particular alliance information should be provided to primary display module 126 and/or secondary display module 128. For example, only certain categories of alliance information such as those intended for broadcast to all alliance members may be provided to primary display module 126 for communication to one or more primary client devices 140 while more sensitive categories of alliance information may be provided to secondary display module 128 for communication to secondary client devices 150 of certain alliance members who have access to the sensitive categories of alliance information.

In some embodiments, alliance information module 132 may receive from one or more alliance members: (i) a communication intended to be broadcast to the all alliance members, (ii) a communication intended to be broadcast to a particular subset of the alliance members (e.g., only alliance members assigned with particular roles), and/or types of communication. For example, an alliance member may generate a communication and indicate that the communication is to be broadcast to all alliance members or just a sub-set of alliance members. Alliance information module 132 may provide the communication to the appropriate one or more alliance members.

In some embodiments, alliance information module 132 may determine that different alliances are to be provided with their own respective alliance-specific information. For example, a first alliance will be provided with alliance information that relates to the first alliance while a second alliance will be provided with alliance information that relates to the second alliance. The first alliance may not have access to the alliance information of the second alliance and vice versa. Alliance information module 132 may identify primary client devices 140 and secondary client devices 150 that are being operated or used by alliance members and therefore cause appropriate alliance-specific information to be communicated to appropriate primary client devices 140 and/or secondary client devices 150. Alliance information module 132 may make such identifications based on, for example, information from coordination module 124.

In some embodiments, an alliance may form a treaty or otherwise cooperate with another alliance. For example, a first alliance may form a treaty with another alliance. Alliance information module 132 may provide at least some of the alliance information of the first alliance to the second alliance and vice versa. The first alliance and/or the second alliance may indicate which alliance information is to be shared to the other alliance. Alliance information module 132 may receive these indications and provide alliance information accordingly.

Access to shard alliance information from another alliance may be restricted based on roles of alliance members. For example, a leader of a first alliance may restrict access to particular alliance information of the first alliance to a leader of the second alliance and no other members of the second alliance. As such, alliance information module 132 may provide the particular alliance information only to secondary display module 128 for communication to a secondary client device 150 of the leader of the second alliance. When the treaty has been terminated, alliance information module 132 may receive an indication of the termination and automatically terminate information sharing as well.

In some embodiments, alliance control module 134 may be configured to cause actions of the alliance to be controlled. Actions may include, for example, attacking an enemy base, adding alliance assets such as virtual troops, commanding alliance assets to move to a specified position, making peace with an enemy, declaring war against other users, accepting new alliance members, and/or other actions that may be performed in relation to an alliance.

In some embodiments, alliance control module 134 may provide one or more controls for issuing commands that cause alliance actions to one or more alliance members. For example, the one or more controls may be provided to secondary display module 128 for communication to secondary client device 150, where the controls are presented to the user for receiving control inputs.

In some embodiments, certain controls may be provided to some alliance members such as leaders but not provided to other alliance members. In this manner, different alliance members may receive different controls. Alliance control module 134 may use roles assigned to different alliance members to determine which alliance members should receive certain controls.

In some embodiments, messaging module 136 may be configured to receive a message from an alliance member for providing to one or more alliance members. Unlike general communications intended to be broadcast to all members of an alliance or a subset of the alliance, which may be displayed on primary client device 140 and/or secondary client device 150, messages may be directed to particular secondary devices 150 of identified alliance members. For example, messaging module 136 may provide a messaging service that allows one or members of an alliance to provide a message or communication to one or more members' secondary client device 150.

In some embodiments, the sending alliance member need not know an identifier of the target secondary client device 150 (such as a phone number or other unique identifier) in order to direct communication to the secondary client device. For example, coordination module 124 may track secondary client devices 150 that have logged on and accordingly identify alliance members and their respective secondary client devices.

The primary display may be communicated to and displayed by a primary client device 140 and the secondary display may be communicated to and displayed by a secondary client device 150. Primary client device 140 may include a computing device, a monitor, an input device, and/or other devices that allow viewing and/or interaction with the game. Secondary client device may include a generally portable computing device such as a cellular device, a tablet computing device, and/or other generally portable computing device that is configured to send or receive alliance information via the secondary display during gameplay.

The components illustrated in FIG. 1 may be communicably coupled to one another via various communication links. The communication links may include wired or wireless connections. In some embodiments, the communication links may include a network connection that includes any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network.

The databases 160 and 162 described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Standard Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

Those having skill in the art will recognize that primary client device 140 and secondary client device 150 may each comprise one or more processors, one or more interfaces (to various peripheral devices or components), non-transitory storage media, and/or other components coupled via a bus. The non-transitory storage media, such as non-transitory storage media 138 of game device 120 and non-transitory storage media of primary client device 140 (not illustrated) and non-transitory storage media of secondary client device 150 (not illustrated), may comprise random access memory (RAM), read only memory (ROM), or other memory. The memory may store computer-executable instructions to be executed by the processor as well as data that may be manipulated by the processor. The storage media may comprise floppy disks, hard disks, optical disks, tapes, or other storage media for storing computer-executable instructions and/or data.

In some embodiments, one or more processors (not illustrated in FIG. 1) of secondary client device 150 may be programmed with an agent such as alliance interface module 152. Alliance interface module 152 may facilitate communication with game device 120. For example, alliance interface module 152 may be configured to facilitate a logon process with game device 120 and/or otherwise indicate that the user operation secondary client device 150 is ready to send or receive alliance information.

Alliance interface module 152 may be configured to receive alliance information and display the alliance information on a display device such as a touchscreen of secondary client device 150. Alliance interface module 152 may also facilitate two-way communication between an alliance member operating secondary client device 150 and another user and/or alliance member. In some embodiments, alliance interface module 152 may expose a messaging interface that allows an alliance member to contact another alliance member via their connected secondary client device, assuming that the other alliance member is logged on or otherwise connected to game device 120.

In some embodiments, alliance interface module 152 may present one or more controls for controlling an aspect of the alliance. Different controls may be provided to different alliance members. The determination of which controls should be provided may be made at game device 120 and provided to alliance interface module 152 and/or the determination may be made locally by alliance interface module 152. Such determinations may be based on one or more roles assigned to the alliance member and the nature of the controls, as described herein.

In some embodiments, alliance interface module 152 may allow a user to request from an alliance member permission to join an alliance. In some embodiments, alliance interface module 152 may cause user information such as virtual assets and/or other characteristics of the user to be provided to the alliance member from whom the user is requesting access. In this manner, the alliance member may review the user's credentials in order to determine whether to accept the request to join the alliance.

Other system configurations using a secondary client device for a game may be used as well. For example, commonly owned and co-pending U.S. patent application Ser. No. 13/791,668, filed Mar. 8, 2013, entitled "SYSTEM AND METHOD FOR FACILITATING A GAME THROUGH A PRIMARY CLIENT DEVICE AND IN-GAME CONTENT PURCHASES THROUGH A MOBILE DEVICE," which is incorporated by reference in its entirety herein, describes, among other things, making content purchases using a secondary client device while playing a game using a primary client device.

Figure 2:
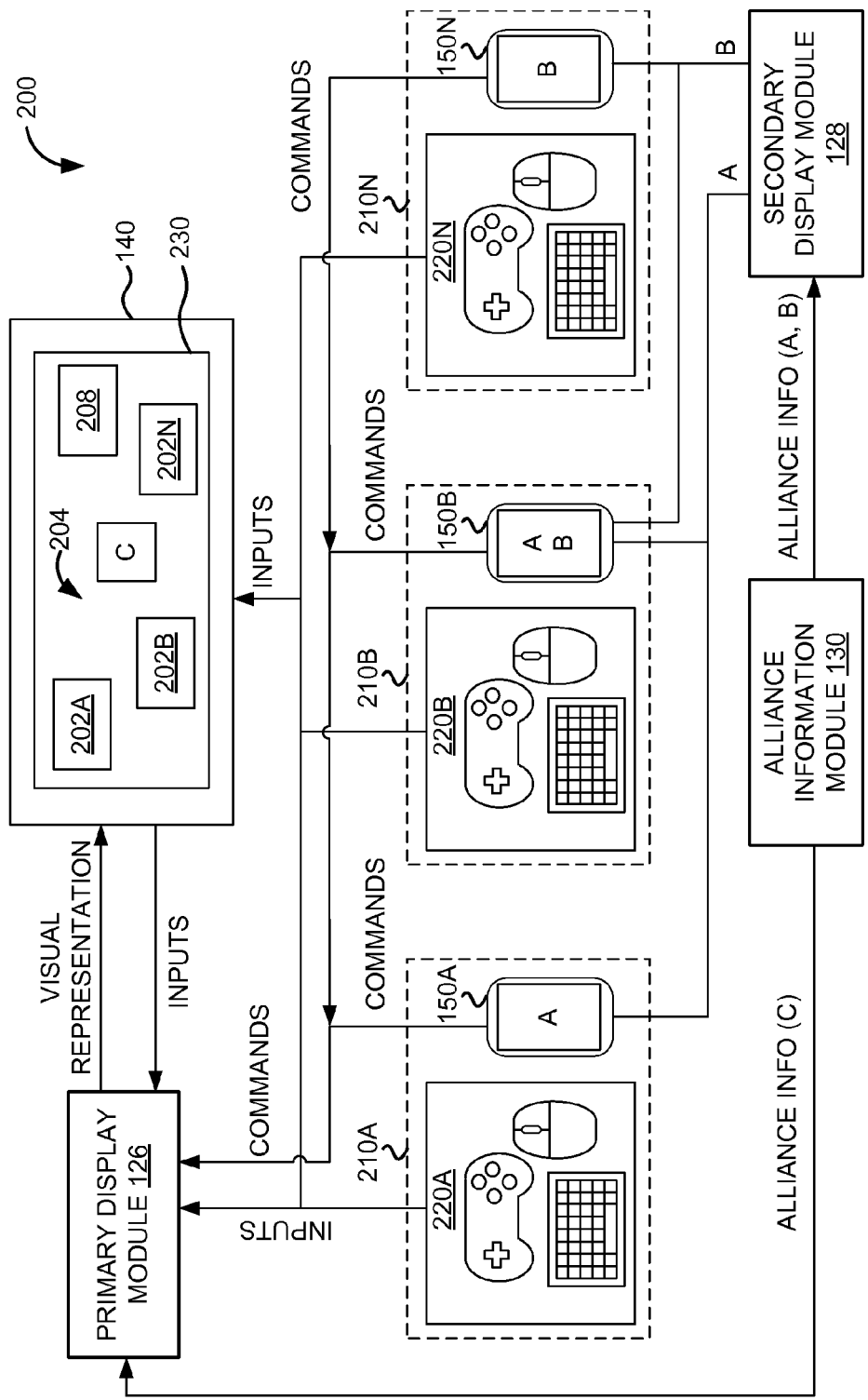
FIG. 2 illustrates an example of a block diagram showing data flows between various components for displaying a game using a primary display and facilitating communication of alliance information and alliance controls using a secondary display, according to an embodiment of the invention.

FIG. 2 illustrates an example of a block diagram 200 showing data flows between various components for displaying a game using a primary display and facilitating communication of alliance information and alliance controls using a secondary display, according to an embodiment of the invention. As illustrated in FIG. 2, one or more input devices 220 (illustrated in FIG. 2 as input devices 220A, 220B, . . . , 220N) and one or more secondary client devices 150 (illustrated in FIG. 2 as secondary client devices 150A, 150B, . . . , 150N) may be operated by respective users 210 (illustrated in dashed boxes 210A, 210B, . . . , 210N). In some embodiments, as illustrated, users 210 may view and interact with game space 204 displayed on a display device 230 of primary client device 140. In some embodiments, users 210 may use their own respective primary client devices 140 to interact with game space 204.

In some embodiments, primary display module 126 may receive at least some alliance information (illustrated in FIG. 2 as alliance information "C") from alliance information module 130. The visual representation provided to primary client device 140 may include the alliance information such that at least some alliance information is displayed on display device 230.

Individual users may control or otherwise interact with one or more respective graphical objects 202 (illustrated in FIG. 2 objects 202A, 202B, . . . , 202N) visually represented in game space 204 of a game. For example, using input device 220A, user 210A may control graphical object 202A. Input signals from input devices 220 may be communicated to primary client device 140 and/or primary display module 126 via one or more wired or wireless communication links. One or more graphical objects 208 may be controlled or otherwise interacted with by other users who are not members of an alliance.

Using a respective secondary client device 150, such as respective mobile devices, individual users 210 may receive alliance information (illustrated in FIG. 2 as alliance information "A" and "B") while playing the game. For example, alliance information module 130 may provide the alliance information to secondary display module 128, which communicates the alliance information to respective secondary client devices 150 during the game. In some embodiments, secondary display module 128 provides the same or different alliance information to different secondary client devices 150.

Using a respective secondary client device 150, individual users 210 may operate different controls for controlling one or more actions of the alliance. Responsive to manipulation of the controls, secondary client device 150 may communicate commands for executing the actions to primary display module 126, which facilitates the actions to be performed. Although not illustrated for convenience, the commands may be communicated to secondary display module 126 as well.

In some embodiments, a particular alliance member may not be using a secondary client device 150 while playing the game, instead using only primary client device 140. In these embodiments, secondary display module 128 may cause the alliance information that was destined for the secondary client device 150 to be provided to primary display module 126 for communication to a primary client device 140 being used by the particular alliance member. When the alliance information that was destined for the secondary client device 150 is private information or should otherwise be shared only with the particular alliance member, the alliance information may be provided to the primary client device being used by the particular alliance member if being used only by that alliance member. If primary client device 140 is shared with another alliance member or user who does not have access to the alliance information, a message indicating that such private alliance information is available may be displayed without displaying the actual private alliance information.

In some embodiments, alliance information provided to primary client device 140 may be the same as or different from the alliance information provided to secondary client device 150. For example, some alliance information may be provided to both primary client device 140 and secondary client device 150. Other alliance information may be provided only to primary client device 140. Still other alliance information may be provided only to secondary client device 150.

Figure 3A:
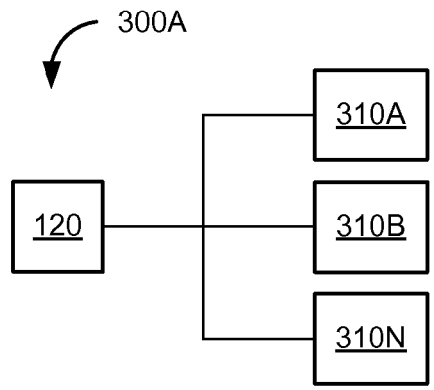
FIG. 3A illustrates a block diagram of multiple architectures for interacting with a game device, according to an embodiment of the invention.

FIG. 3A illustrates a block diagram 300A of multiple architectures for interacting with a game device 120, according to an embodiment of the invention. As illustrated, game device 120 may be communicably coupled to one or more architectures 310 (illustrated in FIG. 3A as architectures 310A, 310B, ..., 310N) that may individually connect one or more users to game device 120 for playing the game.

Figure 3B:
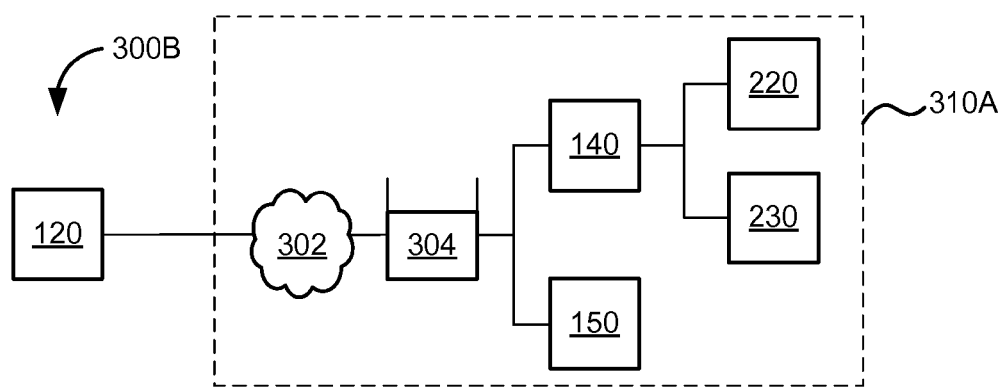
FIG. 3B illustrates a block diagram of a first particular architecture for interacting with the game device, according to an embodiment of the invention.

FIG. 3B illustrates a block diagram 300B of a first particular architecture 310A (illustrated in dashed box) for interacting with game device 120, according to an embodiment of the invention. In the illustrated embodiment, game device 120 may be configured as a networked server device that facilitates online gameplay between one or more users. A particular user or group of users may play the game and send or receive alliance information via primary client device 140 and send or receive alliance information via secondary client device 150. One or more primary client devices 140 and one or more secondary client devices 150 may have a wireless or wired connection to one or more routers 304 as well. Router 304 may be communicably coupled with game device 120 via a network 302, which may include one or more networks described herein such as the Internet. Primary client device 150 may include one or more input devices 220 and one or more display devices 230 for displaying the game space.

Figure 3C:
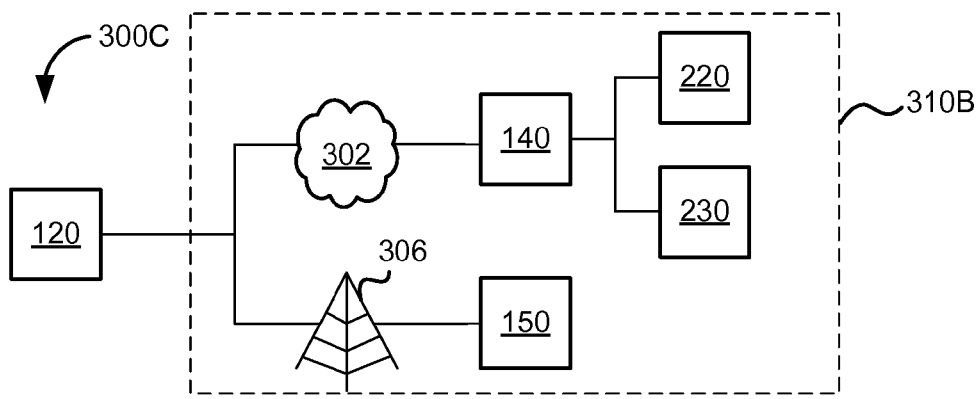
FIG. 3C illustrates a block diagram of a second particular architecture for interacting with the game device, according to an embodiment of the invention.

FIG. 3C illustrates a block diagram 300C of a second particular architecture 310B for interacting with a game device 120, according to an embodiment of the invention. The configuration and architecture 310B is similar to architecture 310A. However, instead of using the same communication channel over network 302 as primary client device 140, secondary client device 150 may use a separate network connection, such as a cellular communications network 306. As illustrated, router 304 is omitted for clarity, although primary client device 140 may connect to network 302 via a router.

Figure 4A:
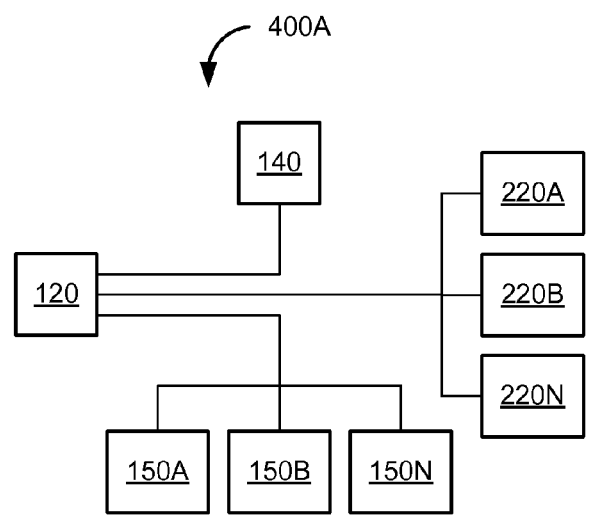
FIG. 4A illustrates a block diagram of an example of a game device locally coupled to a primary client device, one or more input devices, and one or more secondary client devices, according to an embodiment of the invention.

FIG. 4A illustrates a block diagram 400A of an example of a game device 120 locally coupled to one or more primary client devices 140, one or more input devices 220, and one or more secondary client devices 150, according to an embodiment of the invention. In this embodiment, primary client device 140 may include a standalone display device such as a monitor or television set. Game device 120 may provide video and/or audio signals related to the game for displaying on primary client device 140. One or more users may use a respective user input device 220 to interact with the game space displayed by primary client device 140 (which may, for example, be shared among different users in the same room) and a respective secondary client device 150 for sending or receiving alliance information.

Figure 4B:
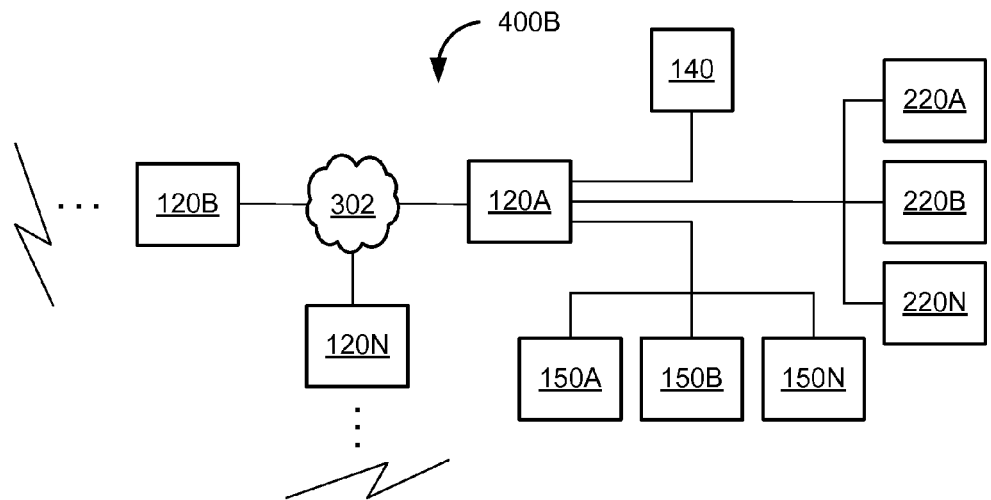
FIG. 4B illustrates a block diagram of an example of game devices coupled to one another over a network and individually being locally coupled to a primary client device, one or more input devices, and one or more secondary client devices, according to an embodiment of the invention.

FIG. 4B illustrates a block diagram 400B of an example of game devices 120 coupled to one another over a network 302 and individually being locally coupled to a primary client device 140, one or more input devices 220, and one or more secondary client devices 150, according to an embodiment of the invention. The configuration illustrated in block diagram 400B is similar to the configuration illustrated in block diagram 400A. However, a game device 120 may be communicably coupled to one or more other game devices 120 over network 302. For example, as illustrated, game device 120A may be coupled to game devices 120B, 120N, which may each have similar configurations of components (omitted from FIG. 4A for convenience and indicated by ellipses) as game device 120A. In this configuration, game devices 120 may form peer-to-peer or other network connections that may be mediated by a server device (not illustrated in FIG. 4A).

Figure 5:
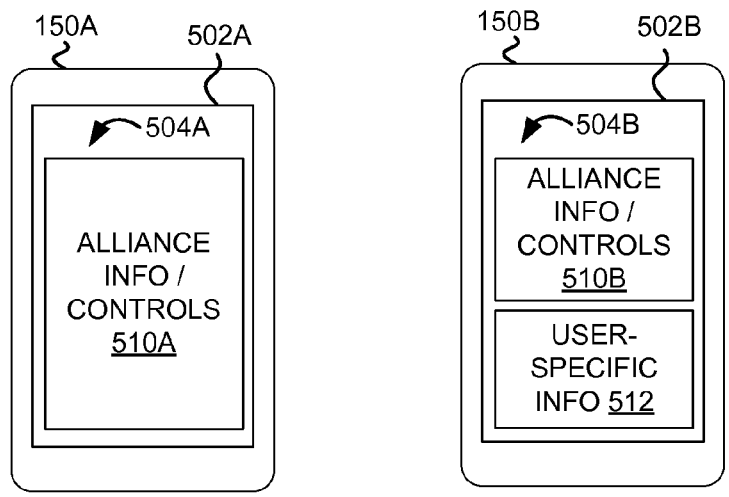
FIG. 5 illustrates examples of secondary displays communicated to and displayed at a secondary client device, according to an embodiment of the invention.

FIG. 5 illustrates examples of secondary displays communicated to and displayed at a secondary client device, according to an embodiment of the invention. In some embodiments, secondary client device 150A may include a display device 502A such as a touchscreen or other type of display device. Secondary client device 150A may receive a secondary display 504A (e.g., from secondary display module 128). Secondary display 504A may be rendered or otherwise displayed by an agent operating on secondary client device 150A, such as alliance interface module 152 (illustrated in FIG. 1). In some embodiments, secondary display 504A may include instructions for rendering the display such as formatting instructions and information to be displayed on the display. In some embodiments, secondary display 504A includes only information to be displayed such that the agent formats and renders the display.

The secondary display 504A may provide alliance information and/or controls 510A (illustrated in FIG. 5 as alliance info/controls 510A) such that a user may receive or send alliance information. In some embodiments, the user may input commands for controlling an action of the alliance using the provided controls.

In some embodiments, secondary client device 150B may include a display device 502B such as a touchscreen or other type of display device. Secondary client device 150B may receive a secondary display 504B (e.g., from secondary display module 128). Secondary display 504B may be similar to secondary display 504A except that secondary display 504B provides (or reserves space on the display for) user-specific information 512. User-specific information 512 may include messages targeted for the user (e.g., from another user), game-related information pertaining to the user (e.g., the user's inventory of virtual items, status, etc.), device information (e.g., battery level, phone status, etc.) of secondary client device 150B, and/or other information that may be specific to the user.

As would be appreciated, secondary displays 504A and 504B may individually present navigational controls such that a user may navigate between viewing alliance information, controls, user-specific information, and/or other information to be presented on the secondary displays.

Figure 6:
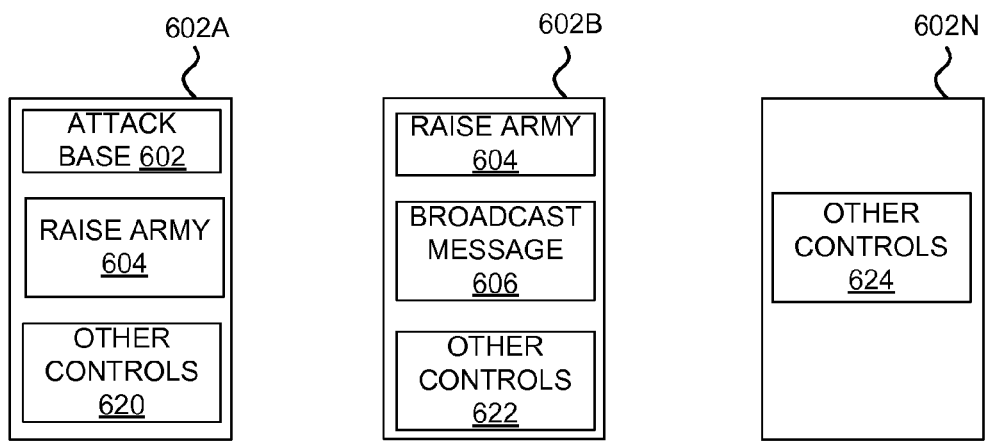
FIG. 6 illustrates examples of different controls displayed on a display device, according to an embodiment of the invention.

FIG. 6 illustrates examples of different controls displayed on a display device, according to an embodiment of the invention. Display devices 602 (illustrated in FIG. 6 as display devices 602A, 602B, ..., 602N) may be configured as part of or coupled to a primary client device or a secondary client device. In other words, at least some controls may be provided on primary client device and at least some controls (e.g., the same or different controls) may be provided on secondary client device.

The controls may include conventional user input components such as text input boxes, selection boxes, etc. In some embodiments, controls for controlling an action may be different for different users depending on, for example, their respective roles. In these embodiments, the appropriate controls may be identified by game device 120 (illustrated in FIG.

1) and/or identified locally by secondary client device 150 (illustrated in FIG. 6 as secondary client device 150A, 150B, . . . , 150N).

For example, display device 602A may display an attack base control 602, a raise army control 604, and/or other controls 620. The different controls may reflect the different roles for one or more alliance members for whom the attack base controls 602, raise army control 604, and/or other controls 620 are intended. Display device 602B may provide a different set of controls, such as a raise army control 604, a broadcast message control 606, and/or other controls 622. These different controls may reflect the different roles for one or more alliance members for whom the raise army control 604, the broadcast message control 606, and/or other controls 622 are intended. Likewise, display device 602B may provide a different set of controls such as other controls 624, reflecting the different roles for one or more alliance members for whom the other controls 624 are intended.

Figure 7:
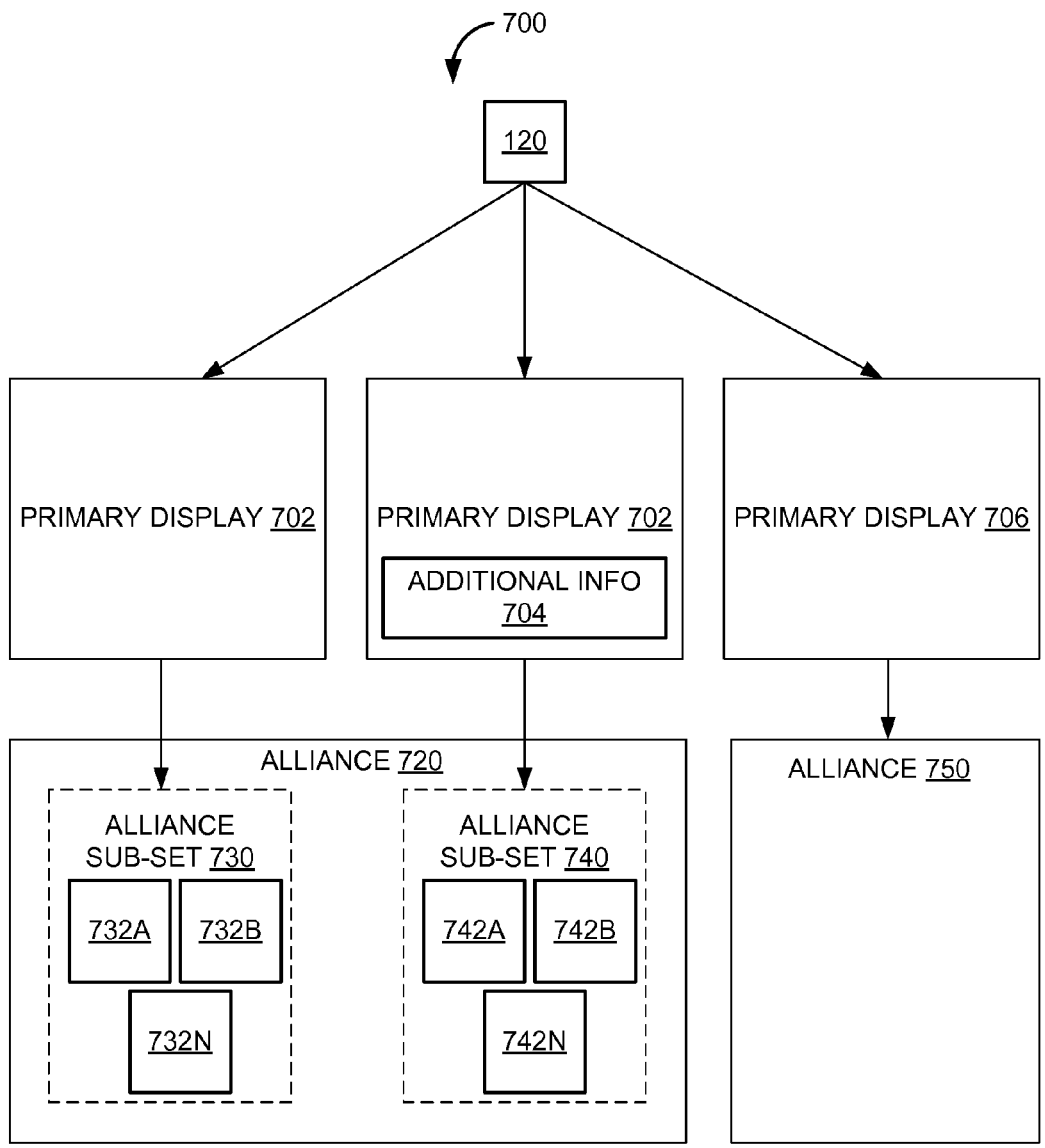
FIG. 7 illustrates examples of primary displays corresponding to respective alliances and sub-sets of alliances, according to an embodiment of the invention.

FIG. 7 illustrates examples of primary displays corresponding to respective alliances and sub-sets of alliances, according to an embodiment of the invention. Game device 120 may communicate primary display 702 corresponding to an alliance 720 and primary display 706 corresponding to alliance 750. For example, primary display 702 may be communicated to one or more primary client devices being used by members of alliance 720 as determined by, for example, coordination module 124 illustrated in FIG. 1. Likewise, primary display 706 may be communicated to one or more primary client devices being used by members of alliance 750.

In some embodiments, as illustrated in FIG. 7, primary display 702 may be augmented with additional information 704 (illustrated in FIG. 7 as additional info 704). Additional information 704 may include information intended for certain alliance members but not others. For example, alliance 720 may include alliance sub-set 730 that includes one or more alliance members 732 (illustrated in FIG. 7 as alliance members 732A, 732B, . . . , 732N) and alliance sub-set 740 that includes one or more alliance members 742 (illustrated in FIG. 7 as alliance members 742A, 742B, . . . , 742N). Although not illustrated, alliance 750 may similarly have alliance members and/or sub-sets of alliance members.

An alliance member 742 may be assigned with a role that grants the alliance member access to additional information 704 while an alliance member 732 may not be assigned with such a role. For example, alliance member 742 may be assigned with a leader role that allows the alliance member to receive certain alliance information that may be restricted to viewing by only leaders. Accordingly, different primary displays may be communicated to different alliance members, which may depend on their assigned roles. Although illustrated as being the same primary display 702 augmented with additional information 704, an entirely different primary display may be communicated to alliance sub-set 740. Furthermore, although only two sub-sets of alliance members is illustrated in FIG. 7, an alliance may include more or less sub-sets of alliance members as well.

Figure 8:
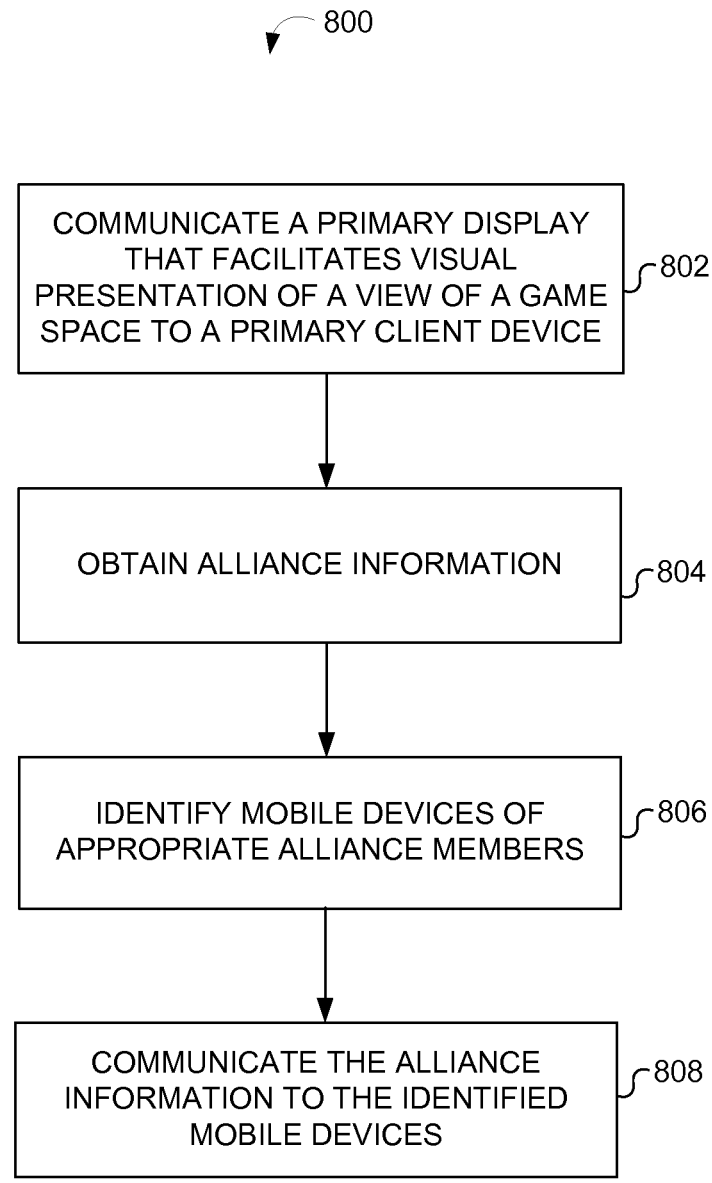
FIG. 8 illustrates a flowchart of a process for facilitating a multi-user game that allows users to form alliances and communicating alliance information during the game to mobile devices associated with alliance members, according to an embodiment of the invention.

FIG. 8 illustrates a flowchart of a process 800 for facilitating a multi-user game that allows users to form alliances and communicating alliance information during the game to mobile devices associated with alliance members, according to an embodiment of the invention. The various processing operations and/or data flows depicted in FIG. 8 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 802, a primary display that includes information that facilitates visual presentation of a view of a game space of a multi-user game may be communicated to a primary client device. In an operation 804, alliance information that describes an alliance having a plurality of alliance members of the multi-user game may be obtained. In an operation 806, respective secondary client device such as mobile devices of one or more appropriate alliance members to whom to communicate the alliance information may be identified. An appropriate alliance member may include an alliance member who has permission to view or otherwise interact with the obtained alliance information. For example, an alliance member may have permission to view or interact with the alliance information based on a assigned role to that alliance member. In an operation 808, the alliance information may be communicated to respective secondary client devices of the appropriate one or more of the alliance members.

Figure 9:
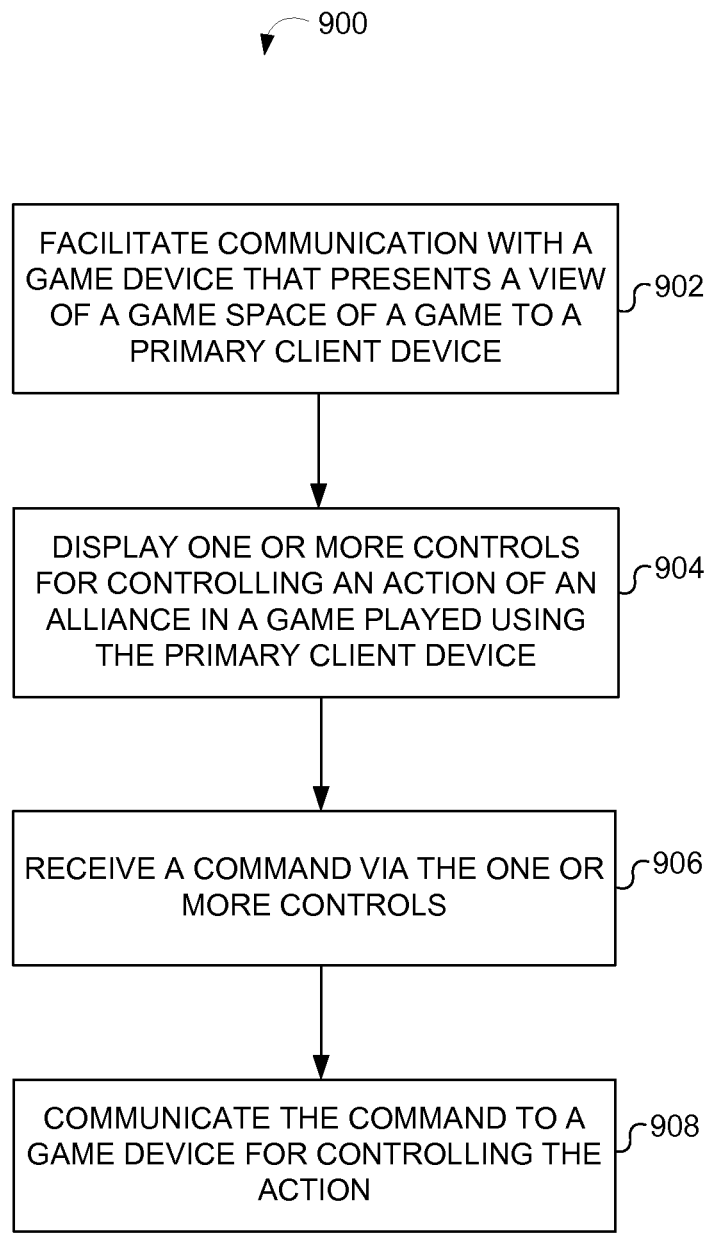
FIG. 9 illustrates a flowchart of a process for displaying alliance information including controls for the alliance on a secondary client device, according to an embodiment of the invention.

FIG. 9 illustrates a flowchart of a process 900 for displaying controls for the alliance on a secondary client device, according to an embodiment of the invention. In an operation 902, communication with a game device that presents a view of a game space of a game to a primary client device may be facilitated. For example, the secondary client device may logon to a game device for playing the game (in addition to use of the primary client device for playing the game). In an operation 904, one or more controls for controlling an action of the alliance may be displayed. The one or more controls may be displayed based on a role assigned to the alliance member operating the secondary client device. In an operation 906, a command may be received via the one or more controls. For example, a user may operate the one or more controls to provide the command. In an operation 908, the command may be communicated to a game device for controlling the action. The game device may execute the command and the resulting command may be reflected in a primary display communicated from the game device to a primary display device operated or viewed by the user.

Figure 10:
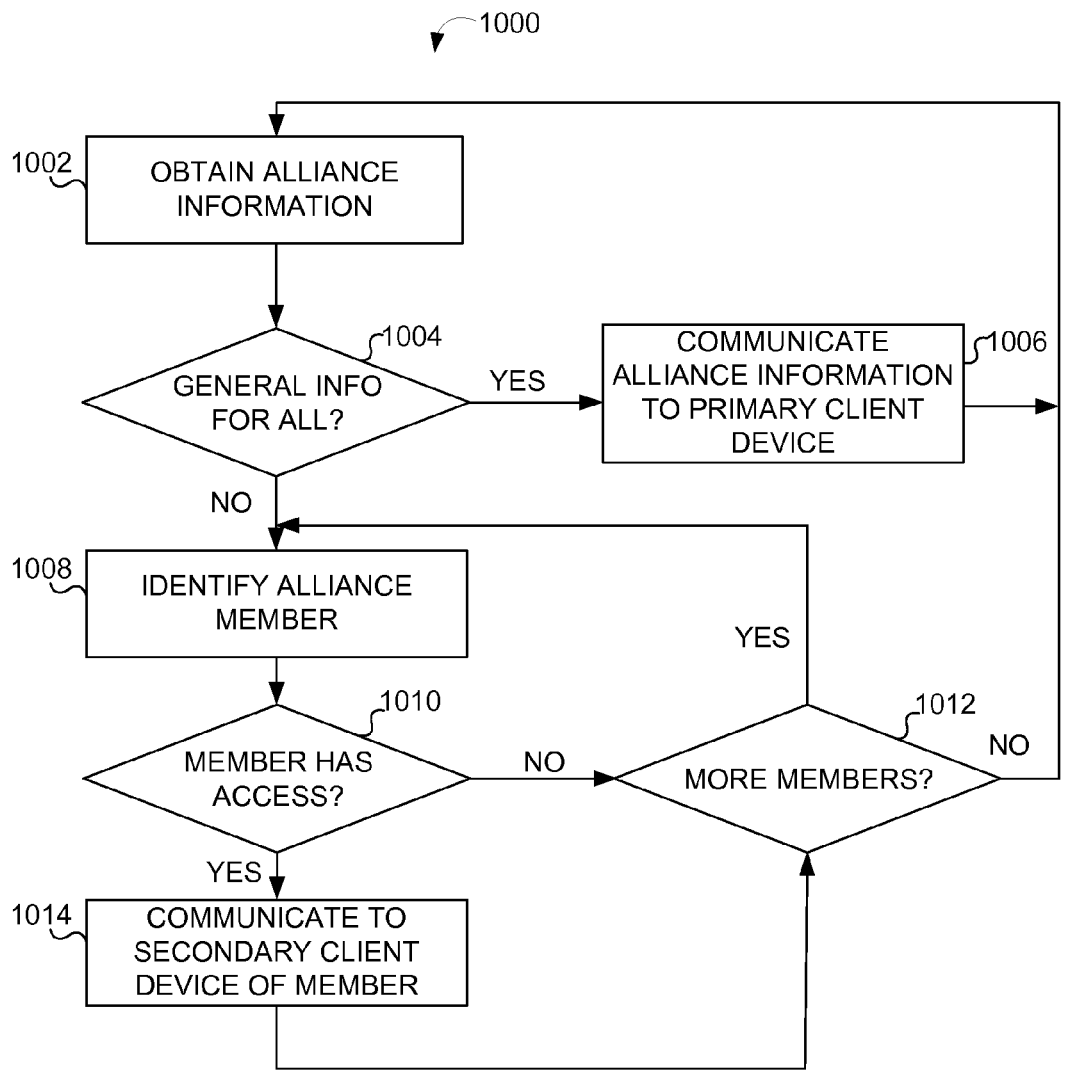
FIG. 10 illustrates a flowchart of a process for selectively communicating alliance information to a primary client device and/or to a secondary client device, according to an embodiment of the invention.

FIG. 10 illustrates a flowchart of a process 1000 for selectively communicating alliance information to a primary client device and/or to a secondary client device, according to an embodiment of the invention.

In an operation 1002, alliance information for an alliance may be obtained. In an operation 1004, a determination of whether the obtained alliance information should be communicated generally to all alliance members may be made. If the obtained alliance information is generally available to all alliance members, the obtained alliance information may be communicated to one or more primary client devices used by all users who are alliance members in an operation 1006. In some embodiments, the obtained alliance information that is generally available to all alliance members may be communicated to secondary client members of all users who are alliance members instead of or in addition to the primary client devices in operation 1006.

In an operation 1008, a particular alliance member may be identified. In an operation 1010, a determination of whether the particular alliance member has access to the obtained alliance information may be made. If the particular alliance member does not have access, a determination of whether there are additional alliance members to be processed may be made in an operation 1012. If there are additional members, processing may return to operation 1008.

Returning to operation 1010, if the alliance member has access to the obtained alliance information, the obtained alliance information may be communicated to a secondary client device used by the alliance member in an operation 1014. A determination of whether there are additional alliance members to be processed may be made in an operation 1012, where processing may proceed as described above.

Although described with respect to video games, the disclosure may be used in other contexts in which a virtual space may be expressed at a primary client device and alliance information may be communicated via a secondary client device during expression of the virtual space. Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A multi-user game computing system that communicates alliance information during a game to mobile devices associated with alliance members, the system comprising:
   one or more physical computer processors configured to execute computer program modules, the computer program modules comprising:
   a primary display module configured to determine and effectuate presentation of a view of a game space on a primary client device, the view forming a multi-user graphical user interface through which multiple users present at the primary client device input game commands for concomitant gameplay by the multiple users of a multi-user game within the game space;
   a secondary display module configured to: (i) obtain alliance information that describes an alliance having multiple alliance members, (ii) identify respective mobile devices of the alliance members participating in gameplay through the multi-user graphical user interface presented on the primary client device, and (iii) communicate the alliance information to the respective mobile devices of the alliance members for presentation to the alliance members on the respective mobile devices in conjunction with participation in gameplay through the multi-user graphical user interface presented on the primary client device, such alliance information being supplemental information for the alliance members during gameplay; and
   an alliance management module configured to classify alliance information into one or more categories individually associated with a level of security such that at least some categories of alliance information are accessible by only a subset of the alliance members.

2. The computing system of claim 1, further comprising:
   an alliance management module configured to form the alliance based on identifications of respective users that are to form the alliance and assign different ones of the alliance members with respective roles in the alliance.

3. The computing system of claim 1, wherein the alliance management module is further configured to:
   form the alliance based on identifications of respective users that form the alliance and assign different ones of the alliance members with respective roles in the alliance, wherein an individual role is used to identify at least one category of alliance information for which the role has access.

4. The computing system of claim 3, wherein the obtained alliance information is accessible by only a subset of the alliance members, wherein the appropriate ones of the alliance members includes only the subset of the alliance members, wherein the secondary display module communicates the obtained alliance information to respective mobile devices of the subset of the alliance members.

5. The computing system of claim 1, wherein the primary display module is further configured such that at least some of the alliance information is included on at least a portion of the multi-user graphical user interface presented on the primary client device.

6. The computing system of claim 1, wherein the secondary display module is further configured to provide user-specific information along with the alliance information to the respective mobile devices of the alliance members for presentation on the respective mobile devices of the appropriate ones of the alliance members.

7. The computing system of claim 1, further comprising:
   an alliance control module configured to receive one or more (lame control commands from the secondary client devices and cause actions with in the game corresponding to the received one or more game control commands.

8. A computer-implemented method for communicating alliance information during a game to mobile devices associated with alliance members, the method being implemented in a computer that includes one or more processors configured to execute computer program modules, the method comprising:
   determining, by a primary display module, a view of a game space for a primary client device, the view forming a multi-user graphical user interface through which multiple users present at the primary client device input game commands for concomitant gameplay by the multiple users of a multi-user game within the game space;
   effectuating presentation, by the primary display module, of the view of the game space on the primary client device;
   obtaining, by a secondary display module, alliance information that describes an alliance having multiple alliance members;
   identifying, by the secondary display module, respective mobile devices of the alliance members participating in gameplay through the multi-user graphical user interface presented on the primary client device;
   communicating, by the secondary display module, the alliance information to the respective mobile devices of the alliance members for presentation to the alliance members on the respective mobile devices in conjunction with participation in gameplay through the multi-user graphical user interface presented on the primary client device, such alliance information being supplemental information for the alliance members during gameplay; and
   classifying, by an alliance management module, alliance information into one or more categories individually associated with a level of security such that at least some categories of alliance information are accessible by only a subset of the alliance members.

9. The computer-implemented method of claim 8, the method further comprising:
   forming, by an alliance management module, the alliance based on identifications of respective users that are to form the alliance and assigning, by the alliance management module, different ones of the alliance members with respective roles in the alliance.

10. The computer-implemented method of claim 8, the method further comprising:

forming, by the alliance management module, the alliance based on identifications of respective users that form the alliance and assigning, by the alliance management module, different ones of the alliance members with respective roles in the alliance, wherein an individual role is used to identify at least one category of alliance information for which the role has access.

11. The computer-implemented method of claim 10, wherein the obtained alliance information is accessible by only a subset of the alliance members, wherein the appropriate ones of the alliance members includes only the subset of the alliance members, wherein communicating the obtained alliance information comprises communicating the obtained alliance information to respective mobile devices of the subset of the alliance members.

12. The computer-implemented method of claim 8, the method further comprising:

providing, by the primary display module, at least some of the alliance information such that at least some of the alliance information is included on at least a portion of the multi-user graphical user interface presented on the primary client device.

13. The computer-implemented method of claim 8, the method further comprising:

providing, by the secondary display module, user-specific information along with the alliance information to the respective mobile devices of the alliance members for presentation on the respective mobile devices of the appropriate ones of the alliance members.

14. The computer-implemented method of claim 8, the method further comprising:

receiving, by an alliance control module, one or more came control commands from the secondary client devices; and causing, by the alliance control module, actions with in the game corresponding to the received one or more game control commands.

* * * * *